Oct. 1, 1935.  R. W. PAYNE  2,016,214
INSULATED RAIL JOINT
Filed March 10, 1933  3 Sheets-Sheet 1

Inventor
Ralph W. Payne,
By D. P. Wolhaupter
Attorney

Oct. 1, 1935.  R. W. PAYNE  2,016,214
INSULATED RAIL JOINT
Filed March 10, 1933  3 Sheets-Sheet 2
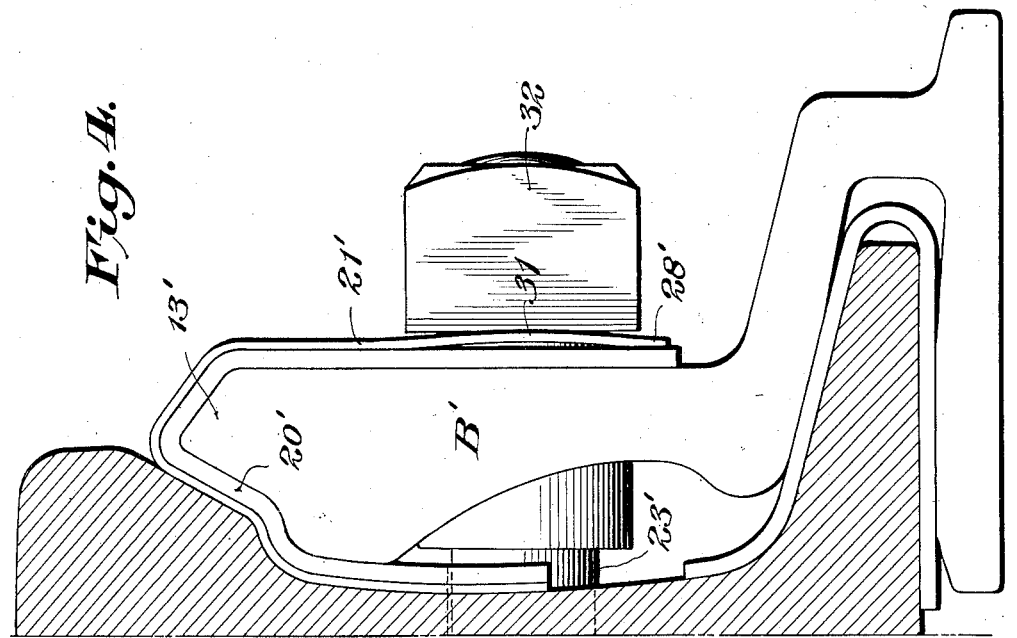
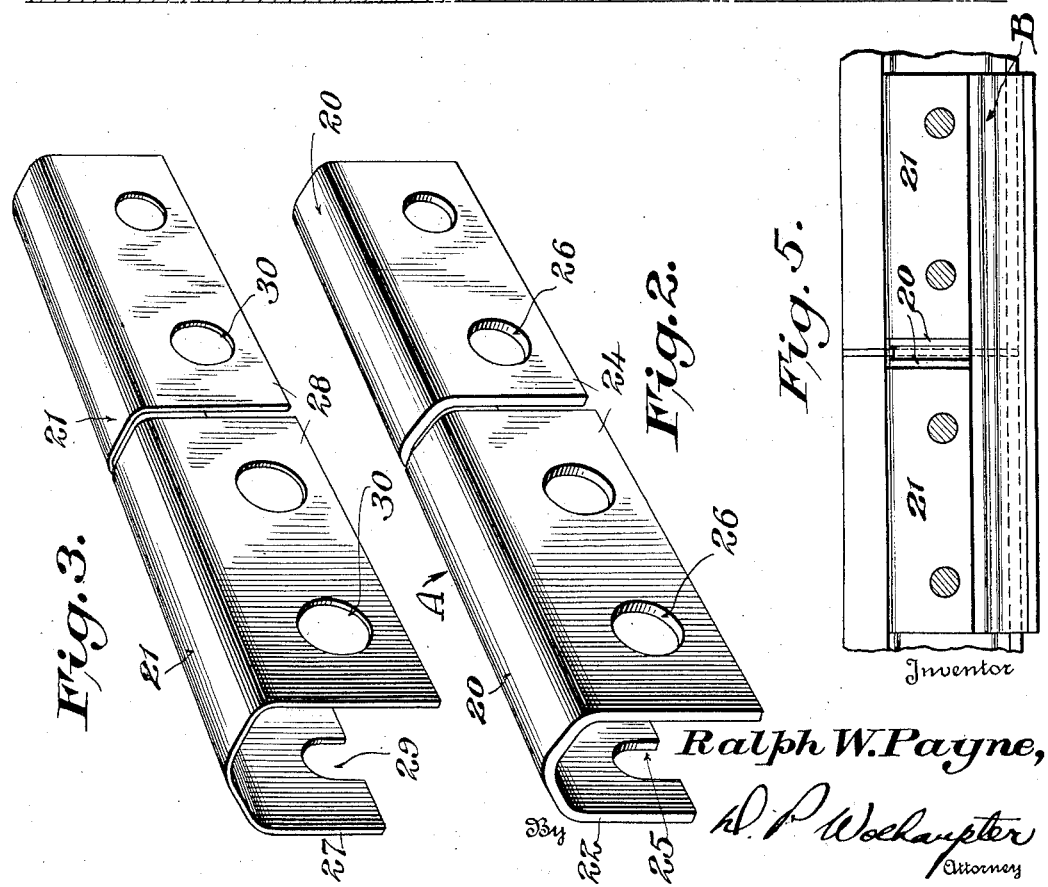
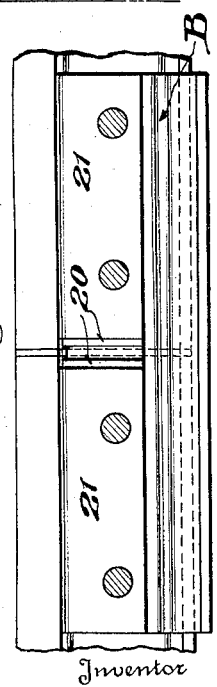
Inventor
Ralph W. Payne, Oct. 1, 1935.   R. W. PAYNE   2,016,214
INSULATED RAIL JOINT
Filed March 10, 1933   3 Sheets-Sheet 3
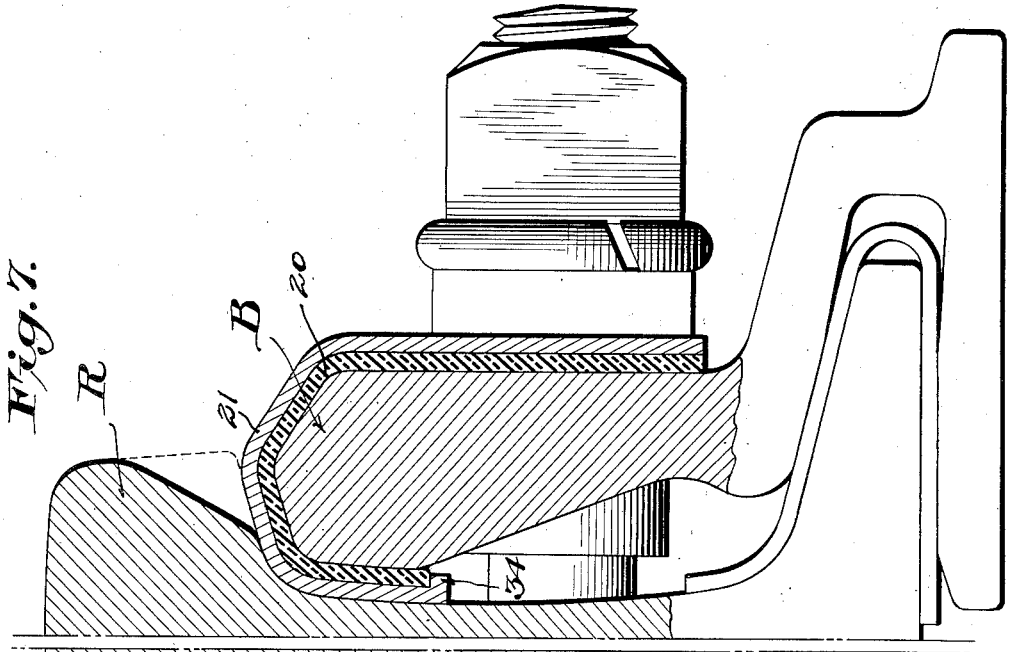
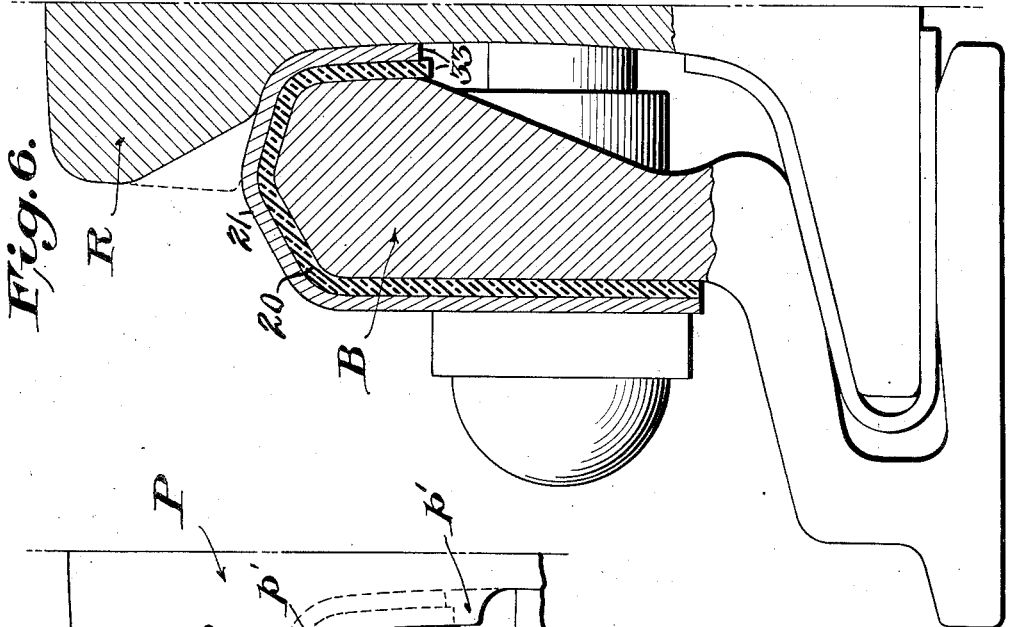
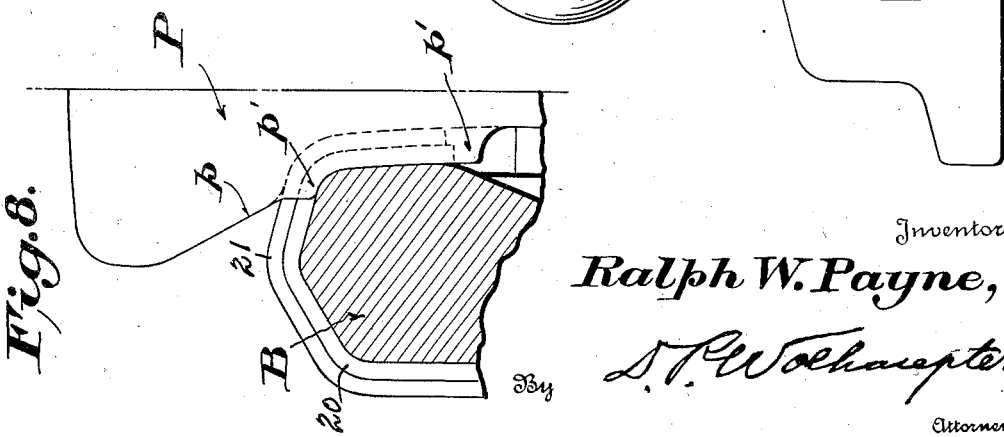
Inventor
Ralph W. Payne,
By
Attorney Patented Oct. 1, 1935

2,016,214

UNITED STATES PATENT OFFICE 2,016,214

INSULATED RAIL JOINT

Ralph Woodruff Payne, Washington, D. C., assignor to The Rail Joint Company, New York, N. Y., a corporation of New York Application March 10, 1933, Serial No. 660,311

3 Claims. (Cl. 238—155)

This invention relates to insulated rail joints, and has particular reference to a novel head insulating unit for such joints embodying a head piece of insulation and a metal chafing guard therefor so shaped and disposed relatively thereto and to the rail and the splice bar as to effectively reduce abrasion and crushing of the insulation, as well as completely shielding the same from exposure to weather conditions, thus to assure longevity and efficient and satisfactory service of the joint.

While the invention is applicable to different types of rail joints, it has special utility and is particularly advantageous when embodied in joints for headfree rail. In an insulated headfree rail joint, wherein the splice bar has loading cooperation at the upper, inner corner of its head with the head fillets of the rails, and wherein the common practice heretofore has been to interpose a head piece of insulation between and in direct contact with the said corner of the splice bar and the head fillets of the rails, frequent renewals of the insulation have been found to be necessary because of the inherent, concentrated, abrasive and crushing action of the splice bar and the rails on the insulation at that location. Accordingly, a special object of the invention is to provide a head insulating unit embodying an insulation element held against movement relatively to the splice bar, and a metal chafing guard interposed between the insulation element and the rails and also held against movement relatively to the splice bar, as well as relatively to the insulation element, whereby any direct abrasive action of the rails on the insulation element is avoided.

Another object of the invention is to provide an insulating unit of the character mentioned in which the insulation element and the metal chafing guard are constructed to be disposed and held in a novel manner against movement relatively to the splice bar, and in which the metal chafing guard constitutes a protective sheath and "weather cover" completely embracing the insulation element.

Another object of the invention is to provide an insulated rail joint in which the loading engagement of the splice bar with the rails through the insulation element and the metal chafing guard is afforded throughout substantially that portion of the joint between the heads of the rails and the line of the bolt holes, or, in other words, between the upper portions of the rail webs and the upper, inner face of the splice bar, whereby loading of the joint has the effect of tightening the joint.

A further object of the invention is to provide a head insulating unit for rail joints which is relatively cheap and easy to produce and which is capable of facile installation in a joint.

With the foregoing and other objects in view, which will become more fully apparent as the nature of the invention is better understood, the invention consists in the novel features of construction, combination and arrangement of elements as will be hereinafter more fully described, illustrated in the accompanying drawings and defined in the appended claims:—

In the drawings:—

Figure 2 is a perspective view of the insulation elements.

Figure 3 is a perspective view of the metal chafing guard.

Figure 4 is a view similar to Fig. 1 illustrating an alternative embodiment of the invention;

Figure 5 is a side elevation of a standard joint constructed in accordance with the invention.

Figures 6 and 7 are similar sectional views of half joints showing additional forms of the invention.

Figure 8 is a detail sectional view showing the relation of the head insulating unit to an insulating end post when this combination is adapted to headfree rail and headfree joints.

Figure 1:
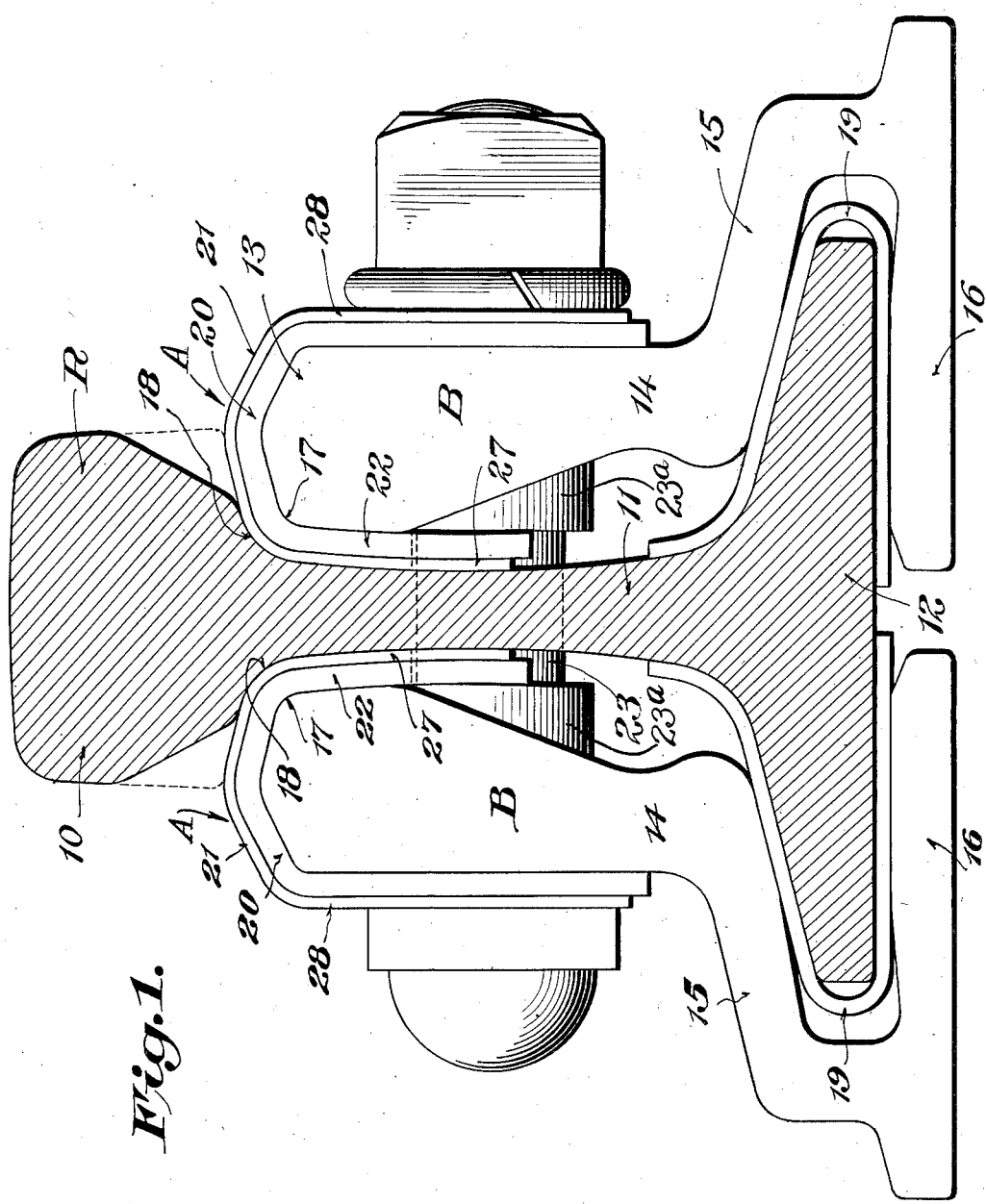
Figure 1 is a cross-sectional view through a rail joint of the headfree type, illustrating one practical form of a head insulating unit embodying the features of the invention, the dotted lines showing outlines of the standard rail head.

Referring in detail first to the example of the invention shown in Figs. 1 to 3 of the drawings, R designates a rail of the headfree type which is inclusive, as usual, of a head 10, a web 11 and a base 12, and which is characterized, as its name implies, by having its head 10 of truncated, inverted pyramidal sectional shape.

The splice bar, designated generally as B, is illustrated in the present instance as being of the well known continuous type inclusive of a head 13, a web 14, and foot and base flanges 15 and 16, respectively, overlying and underlying the rail flange. However, said bar may be of any other suitable type, but regardless of its type its construction preferably is such that the inner face of its head 13 extends upwardly and outwardly corresponding to the conventional upward and outward inclination or curvature of the side of the upper portion of the rail web. Moreover, the outer bolting face of said bar preferably is continuously straight and flat as indicated, and the inner, upper corner of its head 13 is rounded, as indicated at 17, for loading cooperation with the rounded head fillet 18 of the rail.

Between the rail base or flange 12 and the foot and base flanges 15, 16 of the splice bar is interposed a base piece of insulation, designated as 19, which may be of conventional type. On the other hand, the head insulating unit A is of novel form and comprises, as shown, the head pieces of insulation 20 of substantially inverted U-shape in cross-section, and a similarly shaped metal chafing guard designated as 21.

In the two examples of the invention now being described the head pieces of insulation are formed to fit snugly over the head of the splice bar and to extend downwardly, as indicated at 22, over the inner face of the head of the bar either to or a little below the center line of the joint bolts 23, and also to extend downwardly, as indicated at 24, over the outer bolting face of the bar preferably beyond the joint bolts, the said portions 22 and 24 being recessed and apertured, respectively, as best shown in Fig. 2 and as indicated at 25 and 26, for the accommodation of the joint bolts. The insulation is in direct contact with the splice bar and is held against longitudinal creeping or sliding movement relatively to the splice bar by reason of the engagement of the joint bolts in the recesses and the openings 25 and 26. The joint bolts are insulated from the splice bars in conventional manner. That is to say, insulating sleeves 23ᵃ encase the portions of the bolts 23 which extend through the splice bars.

The metal chafing guard 21, which may be formed as a single element or as two separate sections as in the case of the insulation 20 and as illustrated in Fig. 3, is shaped to fit snugly over the head piece of insulation 20 and to snugly embrace the latter and, as shown, said guard, as in the case of the insulation 21, has an inner portion, designated as 27, extending downwardly either to or a little below the center line of the joint bolts, and an outer portion, designated as 28, extending downwardly beyond the joint bolts, said portions 27 and 28 having recesses and apertures 29 and 30, respectively, alined with the recesses and apertures of the insulation 20 for the accommodation of the joint bolts. Thus, the joint bolts also serve to hold the guard 21—21 against longitudinal or creeping movement relatively to the splice bar and relatively to the insulation 20, so that little or no wear on the insulation occurs as a result of an abrasive or chafing action of either the splice bar or the guard thereagainst.

Where the insulation 20 and the guard 21 extend around the upper, inner corner 17 of the splice bar they conform in curvature to the rounding of said corner and to the contour of the rail fillet 18 or, in other words, the upper inner corner of the splice bar and the corresponding corner portions of the insulation and the chafing guard and the rail fillet 18 are curved from a common center, so that the insulation snugly fits the corner of the bar and the chafing guard snugly fits the corner of the insulation and the rail fillet. Thus, the load is transmitted through the head fillet of the rail and through the rounded corner portions of the guard 21 and the insulation to the upper, inner corner of the splice bar, and since all sliding contact at the head of the joint obviously is between the guard and the rail, it follows that the insulation is subjected to little or no chafing or abrasion and consequently possesses long life, particularly since the guard, held firmly by the joint bolts, acts in the nature of a sheath or binding element for the insulation to reduce crushing deformation of the same under load. Moreover, by reason of the inner portions 22 and 24 of the insulation and the guard being confined and clamped between the inner face of the bar head and the adjacent face of the rail web, loading of the rail with consequent tendency to drive the web downwardly between the splice bars produces a wedging action tending to maintain the insulating head unit as well as the joint considered as an entirety rigid and tight.

As will be observed from Figure 2 of the drawings the insulating unit A may be and preferably is divided in two sections, thereby to permit renewal or replacement of one section independently of the other. As is well known, the wear is considerably greater on the insulation beneath the head of the receiving rail, and where a single unit is used, frequently the portion underlying the leaving rail is only slightly worn or not at all, thereby making it necessary to insert an entire new unit providing, of course, a single unit spanning the joint is used. By using a divided unit, it may be only necessary to renew the section underlying the head of the receiving rail, thus effecting material economy of material in renewals as well as time in making the replacement.

It will be understood that the improvement herein claimed in connection with an insulated rail joint combines effectively and in a practical manner with an insulating end post employed between the meeting ends of adjacent rails. This phase of the invention is illustrated in the detailed Fig. 8 of the drawings wherein the insulating end post is designated by the reference letter P and usually conforms to the cross-sectional shape of the rail section. In its adaptation to headfree rail and headfree joint construction, as contemplated by the present invention, the body of the end post P is cut away at the bottom corners of its head as at p and is formed at the head fillets and along a portion of its shank with the laterally projecting insulating flanges p' which enter and fill the gap or space at the center of the joint between the contiguous ends of the opposite head pieces of insulation including the fibre and the metal coverings therefor. Obviously this same end post arrangement will and can be used where the improvement claimed herein is associated with the standard T-rail, in which case an insulating end post of ordinary contour will be employed with the edge portions of the end post extending into the gap or space between the contiguous insulating units at each side of the joint. Furthermore, it will be understood that the construction described, that is, with insulating end post, would be adequately effective where it is desired to insulate one rail end only in a joint by using a single insulating section instead of a pair of such sections, at each side of the joint. With a one end insulated joint it will of course be understood that for the uninsulated rail the joint bars would be supplied with a metal shim or shims of sufficient thickness to compensate for the insulating units employed over the bars for the insulated rail of the joint.

Referring now to the embodiment of the invention illustrated in Fig. 4, it will be observed that the arrangement is substantially the same as illustrated in Fig. 1 with the exception that the head 13' of the splice bar B' and the overlying portions of the insulation 20' and the guard 21' are extended upwardly into the vacated area at the lower inner corner of the rail head.

Figure 4 additionally illustrates that the outer portion 28' of the chafing guard 21' may be bowed outwardly as at 31 in the line of the bolt holes therein or may be otherwise suitably formed to afford either or both a resilient seat for the nuts 32 and means to lock the nuts on the bolts 23'.

A further modification of the invention is suggested in Figs. 6 and 7 of the drawings wherein all of the desirable features of the insulating unit hereinbefore described are preserved with the exception that a saving in metal and fibre may be effected by having the inside legs or skirts 22 and 27 respectively of the insulation and of the metal guard emasculated or cut off, as indicated at 33, so that they will terminate above the line of the bolt holes, as ordinarily the bolts passing through the outer legs or skirts of these pieces will be sufficient to firmly hold them in place on the joint bar to prevent creeping or displacement thereof. Furthermore, it may be found desirable to safeguard the covered insulation, as shown in Fig. 7 of the drawings, by providing the inside leg or skirt of the metal guard 21 with a holding ledge or shoulder 34 engaging beneath the bottom edge of the inside leg or skirt of the insulation or fibre, thereby acting to prevent that part of the fibre falling out of position or being otherwise displaced in the extreme contingency of the same being severed or fractured from the remaining body of the insulation.

According to any embodiment of the invention the base insulation 19 may be covered by a sheath or chafing guard as in the case of the head piece of insulation 20. Moreover, the invention is equally adapted for use in standard joints as in headfree joints as is evident from the illustration in Fig. 5; and as indicated by the dotted lines in Figs. 1, 6, and 7; also, the guard may be formed of different thicknesses to compensate for wear in either standard or headfree joints, and the same may be stepped and the respective end portions thereof may be formed of different thicknesses for use in compromise joints.

By reason of the outer skirt portion of the insulation 20 or 20' extending downwardly over the outer face of the joint bar to the joint bolts, any necessity of the usual fibre washers between the nuts of the joint bolts and the splice bar obviously is avoided.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An insulated rail joint comprising in combination with the rails, the joint bolts, and the splice bars, each of the splice bars having an upper inner rounded corner arranged in loading engagement to the head fillets of the rails, an insulating cover for the splice bar consisting of a pair of spaced and aligned inverted substantially U-shaped insulation sheets entirely enveloping the top of the bar and each formed with an inside depending apron closely fitting the inner side of the bar and having a direct interlocking engagement with the joint bolts and an outer depending apron closely fitting the outer side of the bar and extending to a point below the bolt holes but above the foot of the bar and directly interlocking with the bolts, a pair of aligned protective inverted substantially U-shaped metal guard sections completely encasing therein said insulating cover and having their inner ends spaced apart, each of said metal guard sections being formed with upper inner rounded corners having a loading engagement with the head fillets, and provided with inner depending aprons or flanges directly and clampingly engaging the rail webs and having direct interlocking engagement with the joint bolts, each of said metal sections also having outer depending aprons closely fitting the outer aprons of the insulating cover, coextensive therewith, and directly engaged by the joint bolts whereby the tightening of the joint bolts will tightly clamp together the splice bar, the insulating cover sections and the metal sections into loading engagement with the head fillets of the rails and against the rail webs, and an insulating end post interposed between the rail ends and having projecting edge portions entering the space between the two guard sections.

2. An insulated rail joint comprising, in combination, the rails, the joint bolts, a splice bar having an upper inner rounded corner arranged in loading engagement to the head fillets of the rails, a pair of spaced insulating covers for the splice bar each consisting of an inverted substantially U-shaped sheet of insulating material entirely enveloping the top of the bar and formed with an inside depending apron closely fitting the inner side of the bar and having a direct interlocking engagement with the joint bolts and an outer depending apron closely fitting the outer side of the bar and extending to a point below the bolt holes and directly interlocking with the bolts, a pair of protective inverted substantially U-shaped metal guard sections which mate with and compeltely encasing therein said insulating covers and having their inner ends spaced apart, each of said metal guard sections being formed with upper inner rounded corners having a loading engagement with the head fillets, and provided with inner depending aprons or flanges closely abutting the rail webs and having direct interlocking engagement with the joint bolts, each of said metal sections also having outer depending aprons closely fitting the outer aprons of the insulating cover, coextensive therewith, and directly engaged by the heads and nuts of the joint bolts whereby the tightening of the joint bolts will tightly clamp together the splice bar, the insulating cover and the metal sections into loading engagement with the head fillets of the rails and into tight clamping engagement against the rail webs, and an insulating end post having at the juncture of its head and web projecting edge portions extending to the splice bar through the spaces between both the insulating covers and the metal guard sections.

3. An insulated rail joint for T-rails comprising in combination with the rail and its flange and joint bolts, of a splice bar having a foot flange overlying the rail flange and spaced outwardly from the bottom fillet of the rail and having its inner upper corner arranged in loading engagement to the head fillet of the rail, a U-shaped insulation sheet entirely enveloping the upper portion of the bar and having its inner leg or apron extending into the region of the joint bolts and formed with openings receiving the latter and its outer leg or apron fitting the outer side of the bar and extending to a point below the bolt holes but above the bar flange, and a pair of spaced aligned inverted U-shaped metal guard sections encasing therein said U-shaped insulation sheets and having a direct bearing engagement with the underside of the rail head and against the rail web, the outer legs of said metal sections extending to points below the joint bolts and having openings receiving the latter, a base insulation interposed between the foot flange of the bar and the flange of the rail, and an insulating end post engaging between the spaced metal sections, the said splice bar having an adjustment inwardly and upwardly over the rail flange thereby to maintain the metal sections tightly and frictionally clamped against the rail above the line of the bolt holes.

RALPH WOODRUFF PAYNE.